United States Patent
Okada et al.

(10) Patent No.: US 7,738,772 B2
(45) Date of Patent: Jun. 15, 2010

(54) APPARATUS AND METHOD FOR SYNCHRONIZING VIDEO DATA AND AUDIO DATA HAVING DIFFERENT PREDETERMINED FRAME LENGTHS

(75) Inventors: Tetsuya Okada, Tokyo (JP); Daisuke Hiranaka, Kanagawa (JP)

(73) Assignee: Sony Corporation (JP)

( * ) Notice: Subject to any disclaimer, the term of this patent is extended or adjusted under 35 U.S.C. 154(b) by 1219 days.

(21) Appl. No.: 10/559,419

(22) PCT Filed: Jun. 3, 2004

(86) PCT No.: PCT/JP2004/008053

§ 371 (c)(1),
(2), (4) Date: Dec. 7, 2005

(87) PCT Pub. No.: WO2004/112391

PCT Pub. Date: Dec. 23, 2004

(65) Prior Publication Data

US 2006/0140280 A1 Jun. 29, 2006

(30) Foreign Application Priority Data

Jun. 12, 2003 (JP) .......................... P2003-168019

(51) Int. Cl.
H04N 5/76 (2006.01)
(52) U.S. Cl. ........................................ 386/68; 348/515
(58) Field of Classification Search .................. 386/68, 386/46, 96, 124; 348/512, 513, 515, 500
See application file for complete search history.

(56) References Cited

U.S. PATENT DOCUMENTS

| | | | | |
|---|---|---|---|---|
| 4,703,355 A | * | 10/1987 | Cooper | 348/512 |
| 5,502,573 A | * | 3/1996 | Fujinami | 386/65 |
| 5,675,511 A | * | 10/1997 | Prasad et al. | 715/203 |
| 6,018,376 A | * | 1/2000 | Nakatani | 375/240.28 |
| 6,148,135 A | * | 11/2000 | Suzuki | 386/12 |
| 6,181,383 B1 | * | 1/2001 | Fox et al. | 348/515 |
| 6,262,777 B1 | * | 7/2001 | Brewer et al. | 348/515 |
| 6,381,398 B1 | * | 4/2002 | Yamauchi et al. | 386/52 |

(Continued)

FOREIGN PATENT DOCUMENTS

JP 2001-266549 A 9/2001

(Continued)

*Primary Examiner*—David E Harvey
(74) *Attorney, Agent, or Firm*—Lerner, David, Littenberg, Krumholz & Mentlik, LLP

(57) ABSTRACT

When a pause request occurs, an audio delay time constituted by a delay time of frames of audio data based on the video data frames is found. During the pause, a frame offset time constituted by the offset of the frame start time of the video data and the audio data is monitored. When a pause release request is issued, based on the audio delay time and the frame offset time, the audio correction time to be corrected in the pause request is calculated. Then, when it is judged that the audio data is advanced with respect to the video data based on the audio correction time cumulatively added for each pause request, the video data is delayed by one frame with respect to the audio data, while when it is judged that the audio data is delayed with respect to the video data, the audio data is delayed by one frame with respect to the video data.

8 Claims, 16 Drawing Sheets

U.S. PATENT DOCUMENTS

| | | | |
|---|---|---|---|
| 6,512,884 B1 * | 1/2003 | Sawada | 386/96 |
| 6,583,821 B1 * | 6/2003 | Durand | 348/515 |
| 7,027,714 B2 * | 4/2006 | Ohta et al. | 386/68 |
| 2004/0041946 A1 * | 3/2004 | Gries et al. | 348/515 |
| 2007/0160090 A1 * | 7/2007 | Sugahara | 370/535 |

FOREIGN PATENT DOCUMENTS

| | | | |
|---|---|---|---|
| JP | 2001-346147 A | 12/2001 |

\* cited by examiner

APPARATUS AND METHOD FOR SYNCHRONIZING VIDEO DATA AND AUDIO DATA HAVING DIFFERENT PREDETERMINED FRAME LENGTHS

TECHNICAL FIELD

The present invention relates to an audio/video synchronization processing apparatus and an audio/video synchronization processing method for synchronizing video data and audio data and an audio/video recording apparatus. In particular, the present invention relates to AV (audio/video) synchronization technology at the time of a pause of the video data and the audio data.

BACKGROUND ART

For example, in an audio/video synchronization processing apparatus (AV recording apparatus) such as an input device of an MPEG encoder, generally the frame lengths (frame periods) of input signals of the video data and the audio data are different. Further, it is characterized in the point that the audio data and the video data are fetched in periods of frame units. Below, an explanation will be given of the configuration and mode of operation of such a conventional AV recording apparatus.

FIG. 15 is a view of the system configuration of a conventional AV recording apparatus.

This system is configured by a data controller 2a and a system encoder 3a receiving control commands from a host (HOST) 1a.

The data controller 2a receives control commands from the host 1a at its audio/video controller (AV_CTRL) 21a and controls an audio controller 22a and a video controller 26a based on time information from a timer (TIMER) 24a.

Note that, hereinafter, the audio/video controller will be referred to as an "AV controller".

The AV controller 21a issues control commands to the audio controller (A_CTRL) 22a so as to control the input of the audio data (A_DATA). The input audio data is stored in an audio data memory (A_HEM) 23a.

Further, the AV controller 21a issues control commands to the video controller (V_CTRL) 26a so as to control the input of the video data (V_DATA). The input video data is stored in a video data memory (V_MEM) 25a.

The data controller 2a provides the audio data (A_PTS) and the video data (V_PTS) given a PTS (presentation time stamp) as time information to the system encoder 3a based on the time information from the timer 24a.

The system encoder 3a is controlled by the control commands from the host 1a. The audio encoder (A_ENC) 31a encodes the audio data given the PTS from the data controller 2a. The video encoder (V_ENC) 33a encodes the video data given the PTS from the data controller 2a. A multiplexer (MPX) 32a multiplexes the data encoded by the audio encoder 31a and the video means 33a to generate a bit stream (BSD).

However, in an AV recording apparatus including an MPEG encoder, due to hardware restrictions, the frame periods of the video data and the audio data often cannot be changed. In such cases, if pausing based on the frames of the video data, when subsequently releasing the pause, there is a problem that the audio data will become offset in synchronization from the video data (AV synchronization offset).

With respect to this problem, unless suitable processing is performed, the synchronization offset will build up and the viewer will get a strange feeling.

Below, this conventional problem will be specifically explained by using FIG. 16.

FIG. 16 is a diagram showing an example of the AV synchronization offset when controlling the pause and pause release.

In the conventional AV recording apparatus shown in FIG. 15, the control for fetching the data can only be carried out in frame units. Further, the frame periods of the video data and the audio data (video_frame_time and audio_frame_time) cannot be changed even during a pause.

In FIG. 16, when receiving a pause request (indicated as "P" in the figure) from the host 1a, the pause request is reflected in the data controller 2a at the time t161 of a break between frames in the video data 1. The audio data exists in the middle of the frame period at the time t161, and the pause request is reflected in the next audio frame, therefore tp161 is generated as a difference of the video data and the audio data at the time of a pause.

During a pause, the frame period of the video data and the frame period of the audio data remain unchanged. The difference tp161 between the video data and the audio data at the time of the pause remains as generated uncorrected.

When receiving a pause release request (indicated as "P_RL" in the figure) from the CPU 1a, the pause release request is reflected in the data controller 2a at the timing of the time t162 of the start of input of the video data n (VDn). Here, at the time of pause release, when adjusting the timing of the audio data with respect to the video data by considering the difference tp161 between the video data and the audio data at the time of the pause, no AV synchronization offset occurs.

However, since the difference of frame periods of the video data and the audio data causes generation of the difference tp162 from the time t162 of the pause release to the time of start of input of the audio input data n (ADn) as the difference between the audio data and the video data at the time of pause release, the result is that an AV synchronization offset tp163 occurs at the time of pause release from the time t161 and time tp162.

Particularly, when the frame periods of the video data and the audio data cannot be changed, this tp163 may accumulate with each pause request, therefore will sometimes be perceived as strange.

DISCLOSURE OF THE INVENTION

An object of the present invention is to provide an AV synchronization processing apparatus and method not causing AV synchronization offset in an AV recording apparatus where the frame lengths of the video data and the audio data differ and where the frame lengths of the video data and the audio data cannot be changed.

The present invention was made in consideration of this problem. A first aspect provides an audio/video synchronization processing apparatus for synchronizing video data and audio data having different predetermined frame lengths, comprising:

a timer means;

a storage means for storing a start time of each frame of the video data and audio data, a time of a pause request; and a time of a pause release request counted by the timer means; and a controlling means for determining which of the video data and the audio data to delay in frame units after the pause release request or not to delay either based on the start time of each frame of the video data and audio data, the time of the pause request, and the time of the pause release request.

The controlling means calculates an audio delay time constituted by a delay time of the frames of the audio data based on breaks of frames of the video data at the time of a pause request, monitors a frame offset time constituted by a difference of the frame start time of the audio data with respect to the video data at each start time of each frame of the video data after a pause request, calculates an audio correction time based on the audio delay time and the frame offset time at the time of a pause release request for a pause request, and determines which of the video data and the audio data to delay in frame units or not to delay either after a pause release request based on a cumulative audio correction time obtained by cumulatively adding the audio correction time calculated for each pause release request.

According to the first aspect of the present invention, by acquiring a delay time of the audio data (audio delay time) with respect to the video data at a point of time when a pause request occurs and constantly monitoring the offset time of frames of the video data and the audio data during a pause after that, no matter when a pause release request occurs, the timing of reproduction of the audio data after the pause release is adjusted so as to suppress the offset of the audio data with respect to the video data to one audio data frame or less, therefore the AV synchronization offset can be greatly suppressed.

A second aspect of the present invention provides an audio/video recording apparatus for generating multiplex data including video data and audio data having different predetermined frame lengths, comprising:

a timer means;

a storage means for storing a start time of each frame of the video data and audio data, a time of a pause request; and a time of a pause release request counted by the timer means;

a synchronization controlling means for synchronizing the audio data after a pause release request in frame units based on the start time of each frame of the video data and audio data, the time of the pause request, and the time of the pause release request; and a multiplex data generating means for adding time information to the video data and the audio data synchronized by the synchronization controlling means and generating multiplex data.

According to the second aspect of the present invention, by acquiring a delay time of the audio data (audio delay time) with respect to the video data at a point of time when a pause request occurs and constantly monitoring the offset time of frames of the video data and the audio data during a pause after that, no matter when a pause release request occurs, the timing of reproduction of the audio data after the pause release is adjusted so as to suppress the offset of the audio data with respect to the video data to one audio data frame or less, therefore multiplex data having greatly suppressed AV synchronization offset can be generated.

BEST MODE FOR WORKING THE INVENTION

Below, a preferred embodiment of the present invention will be explained by referring to the attached drawings.

Figure 1:
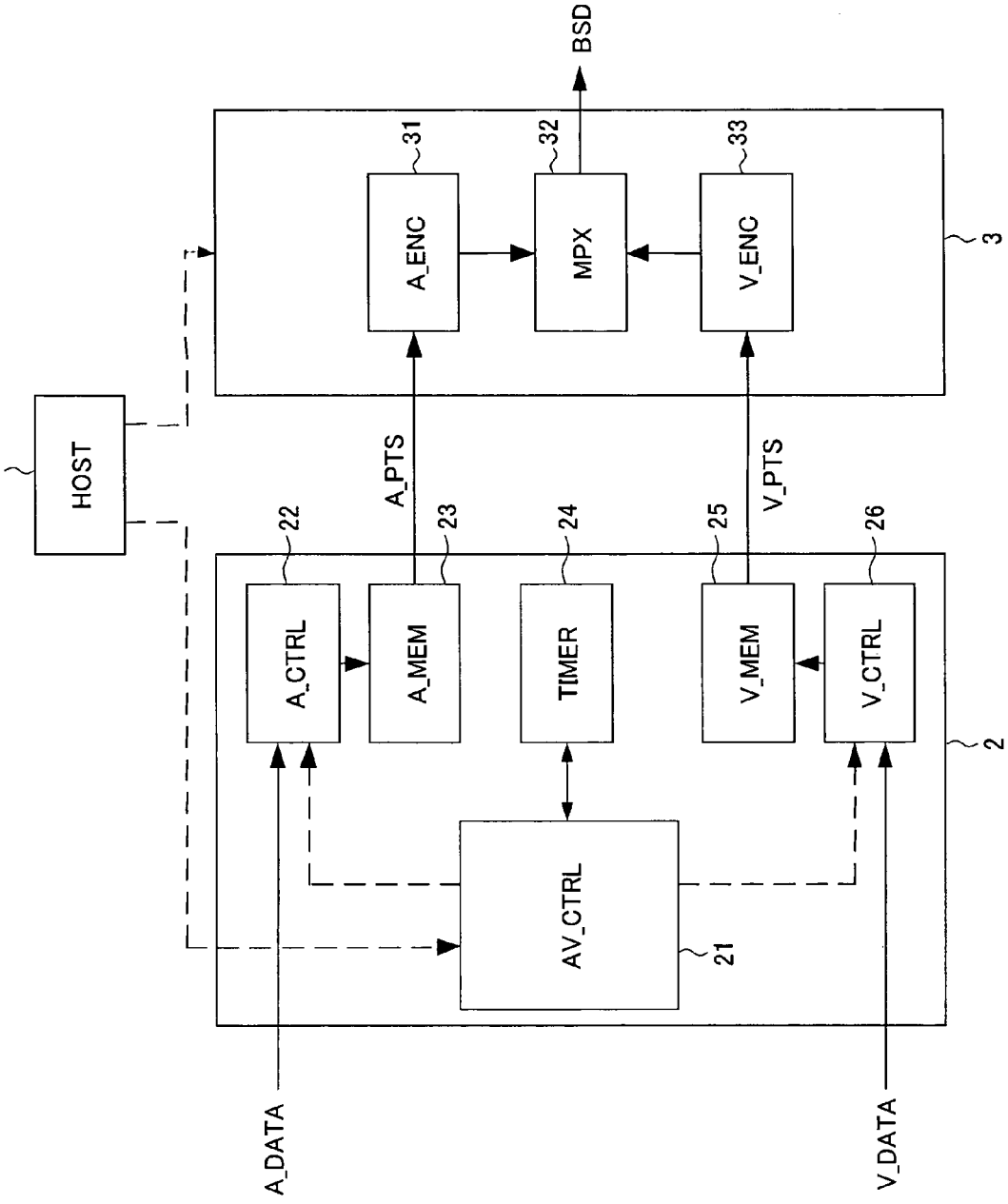
FIG. 1 is a view of the system configuration of an AV recording apparatus as an embodiment of the present invention.
Figure 15:
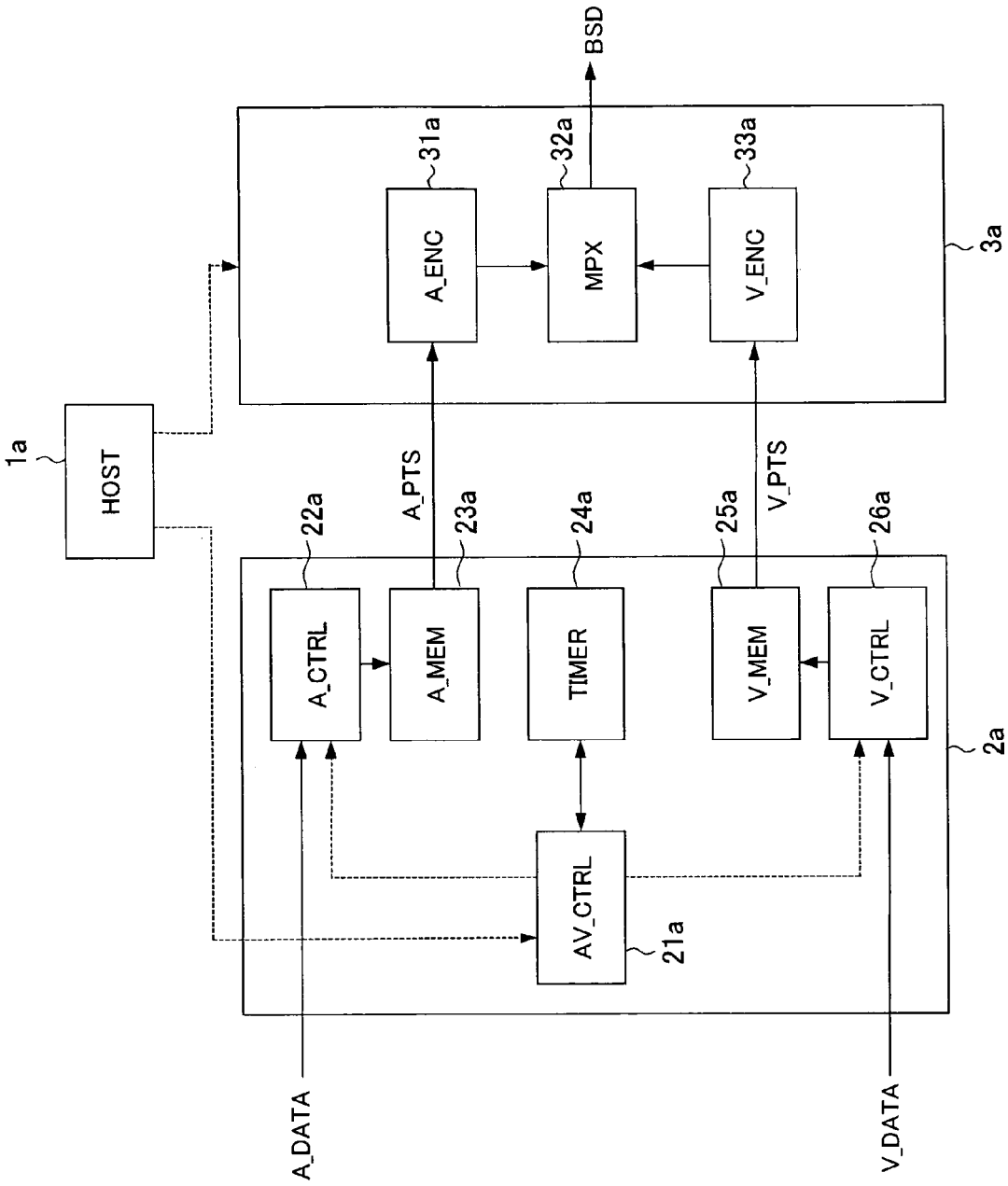
FIG. 15 is a view of the system configuration of a conventional AV recording apparatus.
Figure 16:
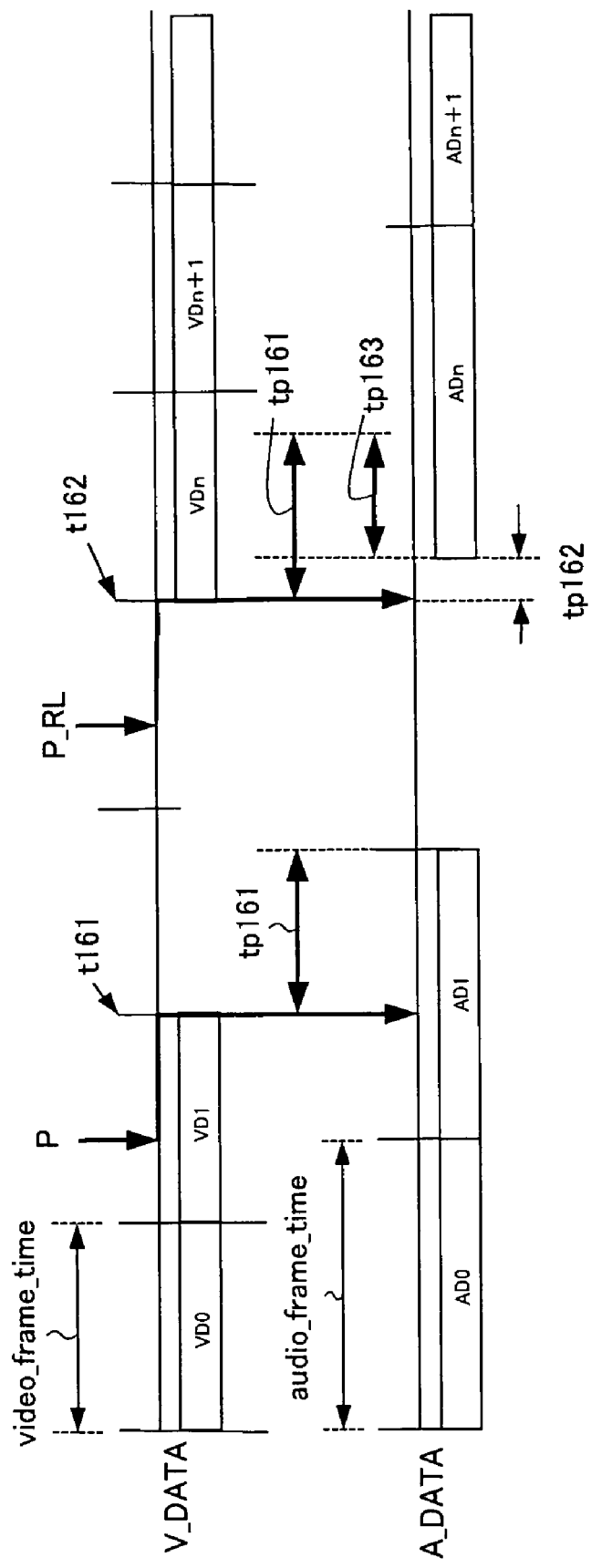
FIG. 16 is a timing chart showing pause and pause release processing of a conventional AV recording apparatus.

FIG. 1 shows an AV recording apparatus as an embodiment of an audio/video synchronization processing apparatus according to the present invention. Note that the AV recording apparatus shown in FIG. 1 has the same system configuration as compared with the conventional AV recording apparatus shown in FIG. 15, but is characterized in the control in the AV controller 21.

Below, successively, processing based on a START request from a host (HOST) 1, processing in a normal mode, processing based on a pause request from the host 1, processing during a pause, processing based on a pause release request from the host 1, and processing for eliminating the AV synchronization offset occurring due to a pause and pause release request in the AV controller (AV_CTRL) 21 will be explained.

First, the processing performed in the AV controller 21 based on the START request from the host 1 will be explained.

Figure 2:
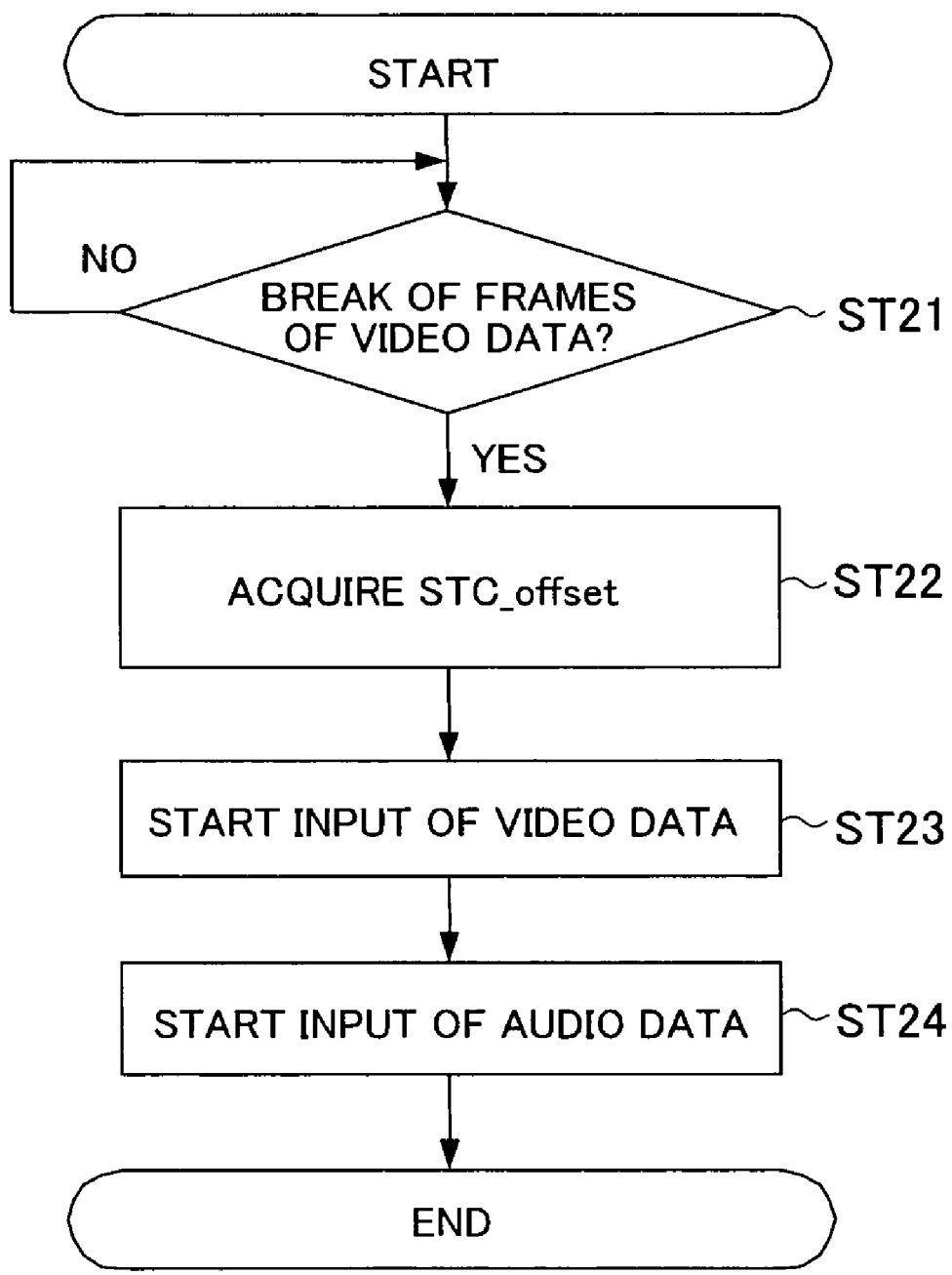
FIG. 2 is a flow chart showing processing when an AV controller 21 receives a START request from a host 1.

FIG. 2 is a flow chart showing the processing when the AV controller 21 receives a START request from the host 1.

Here, when receiving the START request from the host 1, the AV controller 21 acquires the time information from the timer 24 and stores the same as STC_offset in a not shown memory. Note that the timer (TIMER) 24 is a timer operating by for example a clock of 90 kHz.

FIG. 2 shows a processing flow of the START request from the host 1 in the data controller 2.

First, when receiving a START request from the host 1, the AV controller 21 waits for a break of the frames of the video data. When detecting a break of the frames of the video data (ST21), it acquires the time information from the timer 24 and holds the time information as STC_offset (ST22).

Next, it instructs the start of input of the video data to the video controller (V_CTRL) 26 (ST23) and further instructs the start of input of the audio data to the audio controller (A_CTRL) 22 (ST24), whereupon the processing in the START request from the CPU 1 ends.

Figure 3:
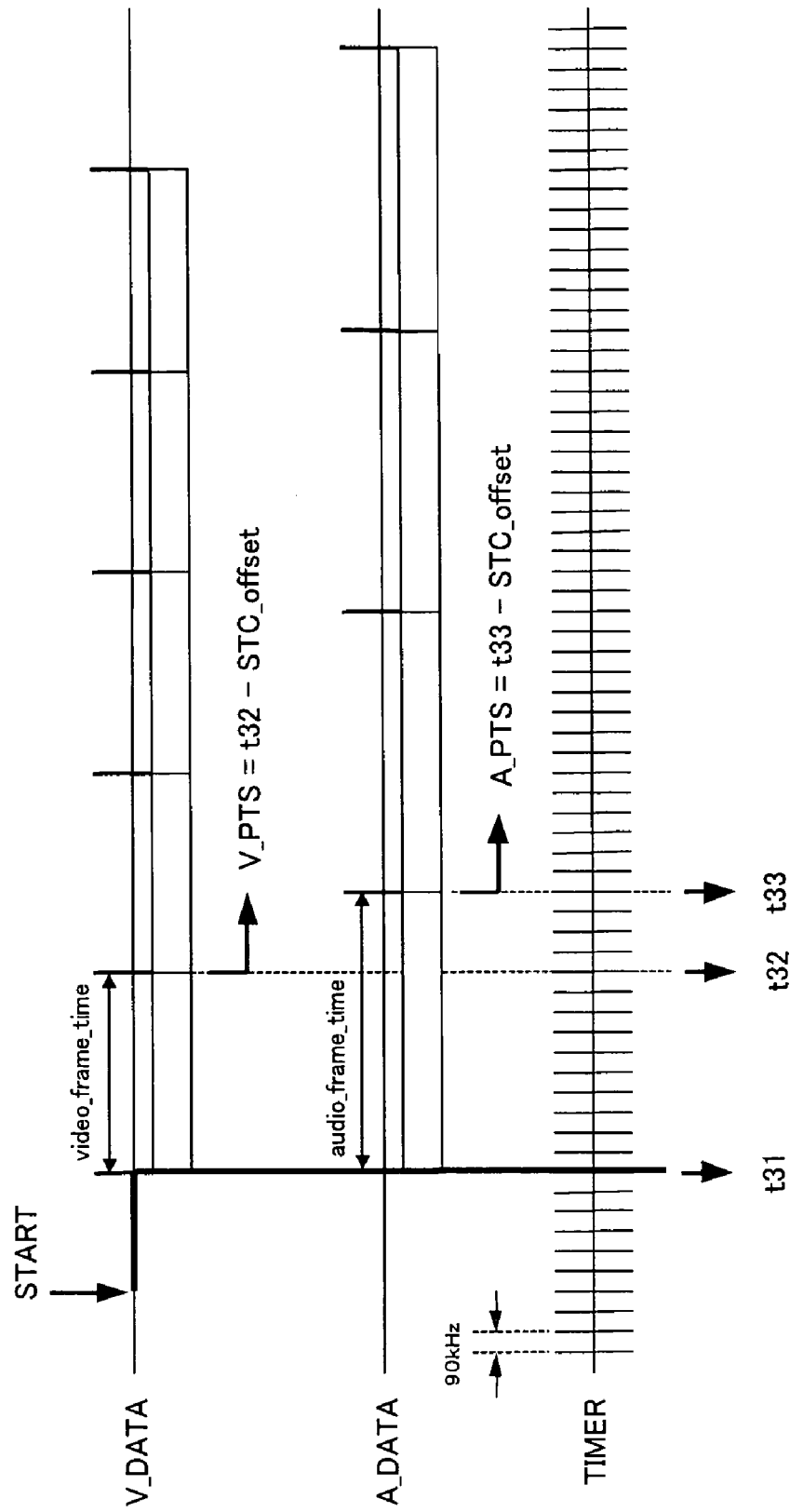
FIG. 3 is a timing chart for explaining a video PTS (V_PTS) and an audio PTS (A_PTS) generated in response to a start of data input.

FIG. 3 is a timing chart for explaining the video PTS (V_PTS) and the audio PTS (A_PTS) generated in response to the start of data input.

In FIG. 3, when receiving a START request from the host 1, the AV controller 21 of the data controller 2 starts the input of the video data and the audio data based on the frames of the video. Then, it acquires the time t31 when starting from the timer 24 and holds it as STC_offset.

Thereafter, at a break of frames of the video data and the audio data, the AV controller 21 successively acquires the present time from the timer 24, subtracts STC_offset (t31) at the time of START from this to obtain PTS, and outputs this to the system encoder 3.

For example, in FIG. 3, when detecting a break of the video data frames, the AV controller 21 acquires the time t32 from the timer 24 and notifies the PTS of the video data together with the video input data to the system encoder 3. When detecting a break of the audio data frames in the same way, it acquires the time t33 from the timer 24 and notifies the PTS of the audio data together with the audio data to the system encoder 3.

Next, the processing in the normal mode after processing the START request from the host 1 will be explained.

Figure 4:
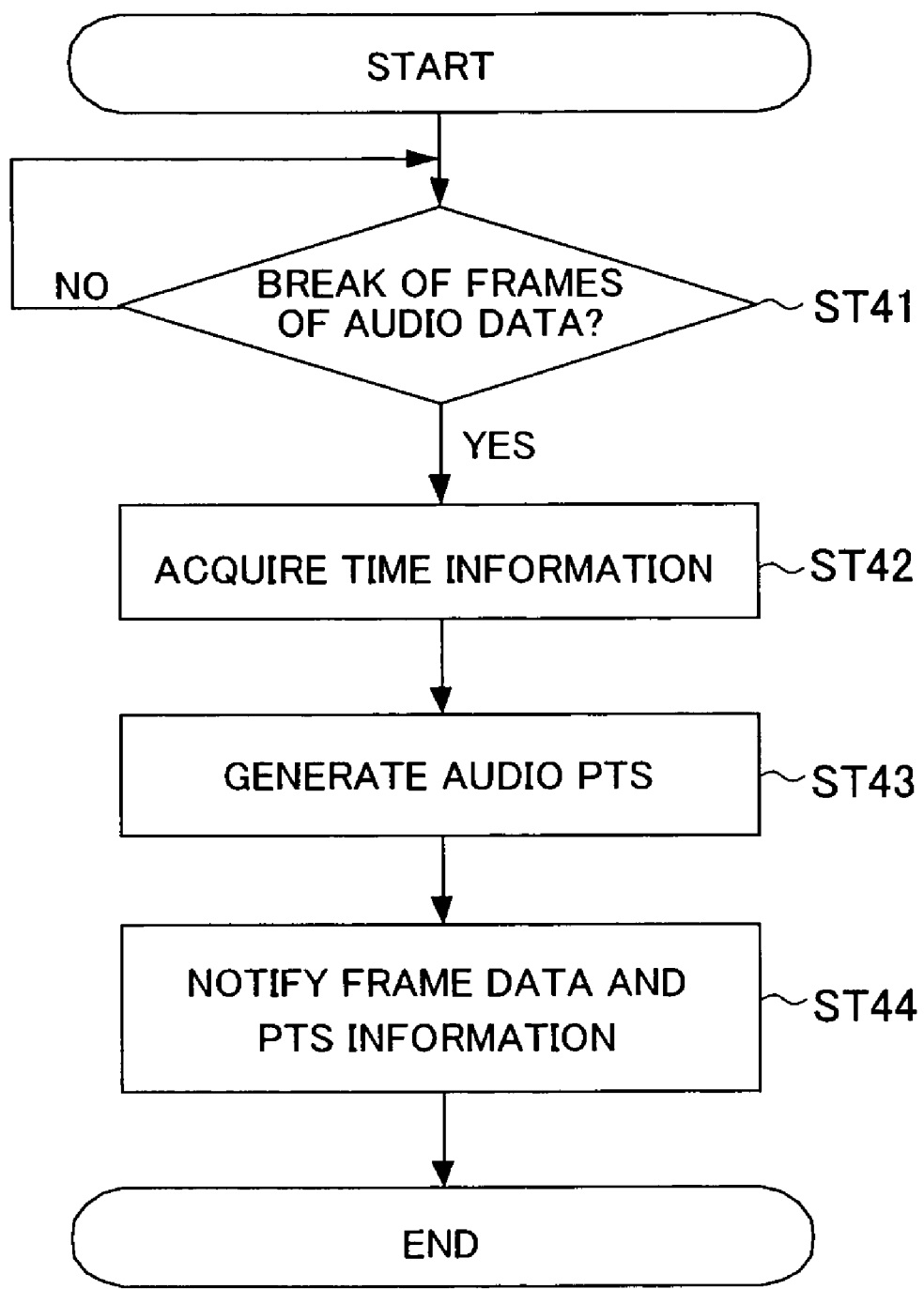
FIG. 4 is a flow chart showing processing for adding a PTS when the data controller 2 provides audio data to the system encoder 3.

FIG. 4 is a flow chart showing processing for adding the PTS when the data controller 2 provides the audio data to the system encoder 3.

When detecting a break of frames of the audio data (ST41), the AV controller 21 acquires the time information from the timer 24 and stores it (ST42). Then, the AV controller 21 generates the audio PTS from the STC_offset stored at the time of START and the acquired time information (ST43). Finally, the AV controller 21 notifies the information obtained by adding the PTS information to the audio frame data to the audio encoder (A_ENC) 31 of the system encoder 3 (ST44).

The above processing is carried out in the normal processing mode for each audio input frame.

Figure 5:
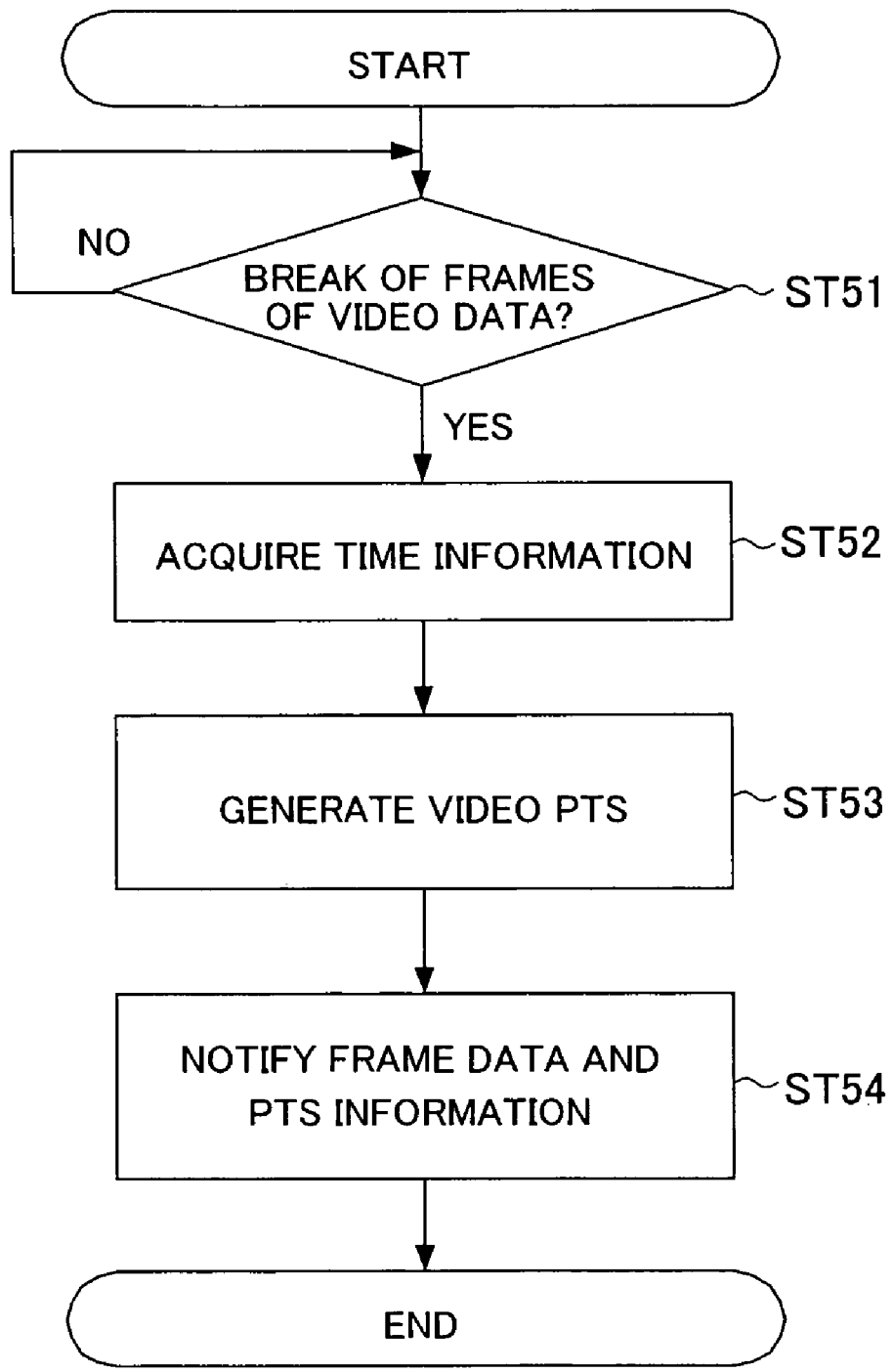
FIG. 5 is a flow chart showing processing for adding a PTS when the data controller 2 provides video data to the system encoder 3.

FIG. 5 is a flow chart showing processing for adding the PTS when the data controller 2 provides the video data to the system encoder 3.

When detecting a break of frames of the video data (ST51), the AV controller 21 acquires the time information from the timer 24 and stores it (ST52). Then, the AV controller 21 generates the video PTS from the STC_offset stored at the time of START and the acquired time information (ST53). Finally, the AV controller 21 notifies the information obtained by adding the PTS information to the video frame data to the video encoder 33 of the system encoder 3 (ST54).

The input of each data is started according to the flow charts shown in FIG. 4 and FIG. 5. The audio data and video data given PTS and AV synchronized are provided from the data controller 2 to the system encoder 3.

Next, the processing with respect to the pause request from the host 1 will be explained.

Figure 6:
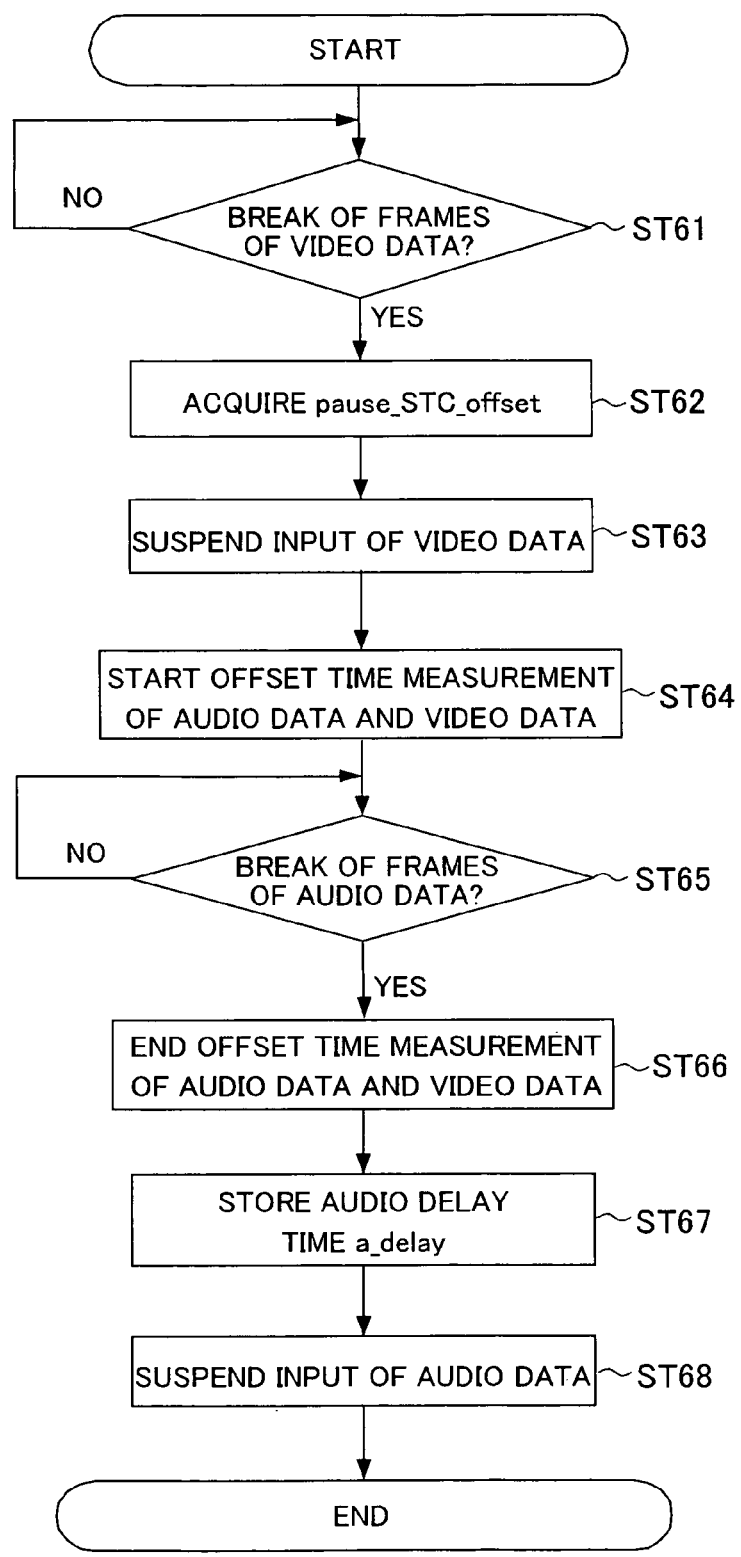
FIG. 6 is a flow chart showing processing performed by an AV controller 21 based on a pause request from the host 1.

FIG. 6 is a flow chart showing processing performed by the AV controller 21 based on a pause request from the host 1. Note that when receiving a pause request from the host 1, the time information acquired by the AV controller 21 from the timer 24 is set as pause_STC_offset.

When receiving the pause request from the host 1, the AV controller 21 waits for a break of frames of the video data, while when detecting the break of frames of the video data (ST61), it acquires the pause_STC_offset as the time information from the timer 24 (ST62). Further, the AV controller 21 instructs the stopping of input of the video data to the video controller 26 (ST63) and starts the offset time measurement of the audio data and the video data based on the time information from the timer 24 (ST64).

Next, the AV controller 21 waits for a break of frames of the audio data. When detecting a break of audio frames (ST65), it ends the offset time measurement of the audio data and the video data based on the time information from the timer 24 (ST66). Simultaneously, the AV controller 21 stores the offset time of the audio data and the video data as the audio delay time (a_delay) (ST67). Further, the AV controller 21 instructs the stopping of input of the audio data (ST68), whereupon the processing in the pause request from the host 1 ends.

Figure 7:
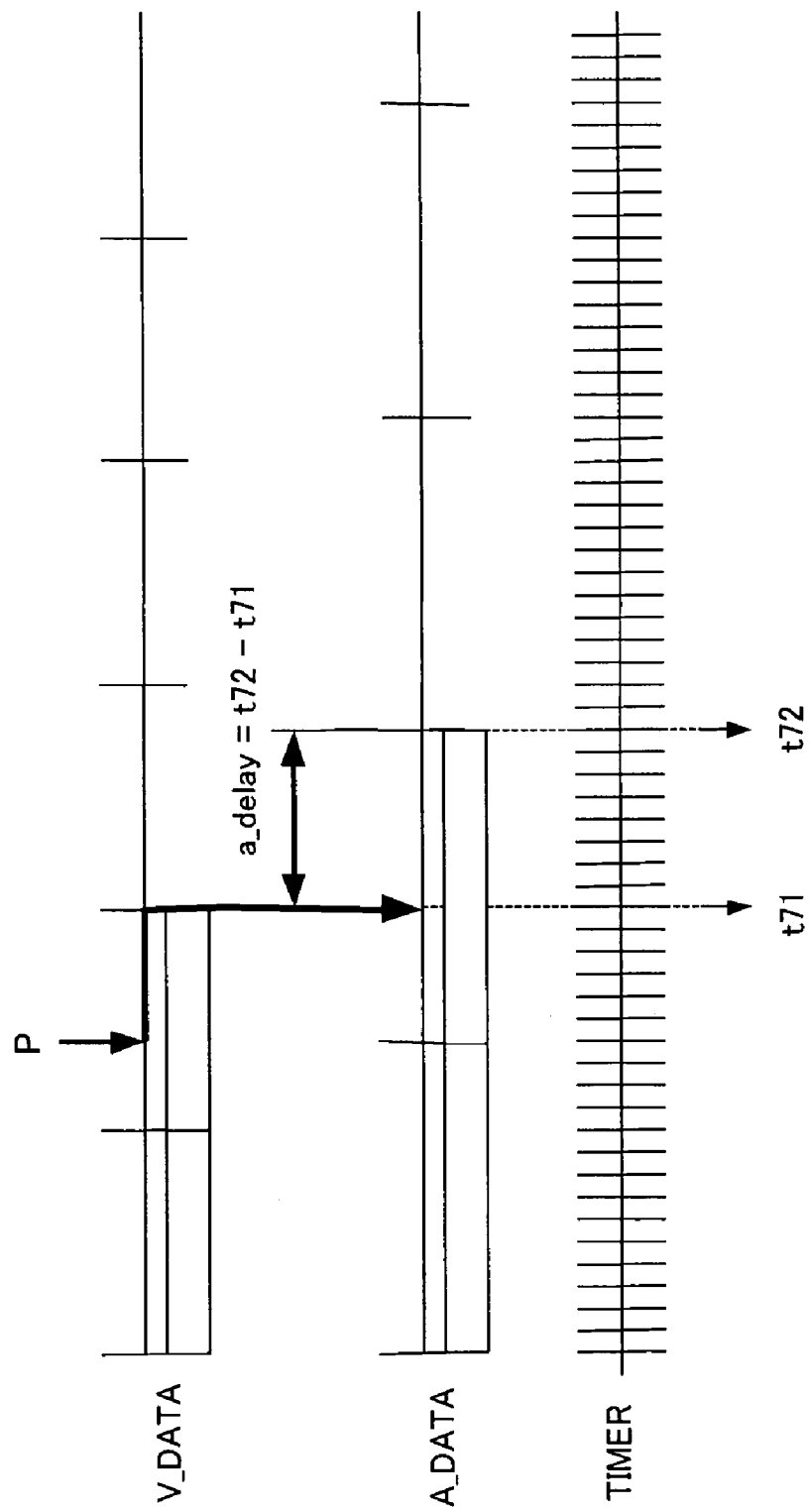
FIG. 7 is a timing chart showing processing with respect to a pause request.

FIG. 7 is a timing chart showing processing with respect to the pause request shown in FIG. 6.

In FIG. 7, when receiving a pause request from the host 1, the AV controller 21 suspends the input of the video data based on the frames of video data. The AV controller 21 stores the time t71 acquired from the timer 24 at this time as pause_STC_offset. Then, when next detecting a break of frames of audio data from the time t71 when pausing the video data input, the AV controller 21 acquires time t72 from the timer 24.

Further, the AV controller 21 stores the difference between the time t72 and the time t71 as a_delay and pauses the input of the audio data.

Next, the processing (processing during pause) after the pause request processing from the host 1 (after t72 in FIG. 7) will be explained with reference to the flow chart shown in FIG. 8.

During the pause, as will be explained later, the AV controller 21 measures the frame offset time (f_count) as the offset time of frames of the audio data and the video data.

Figure 8:
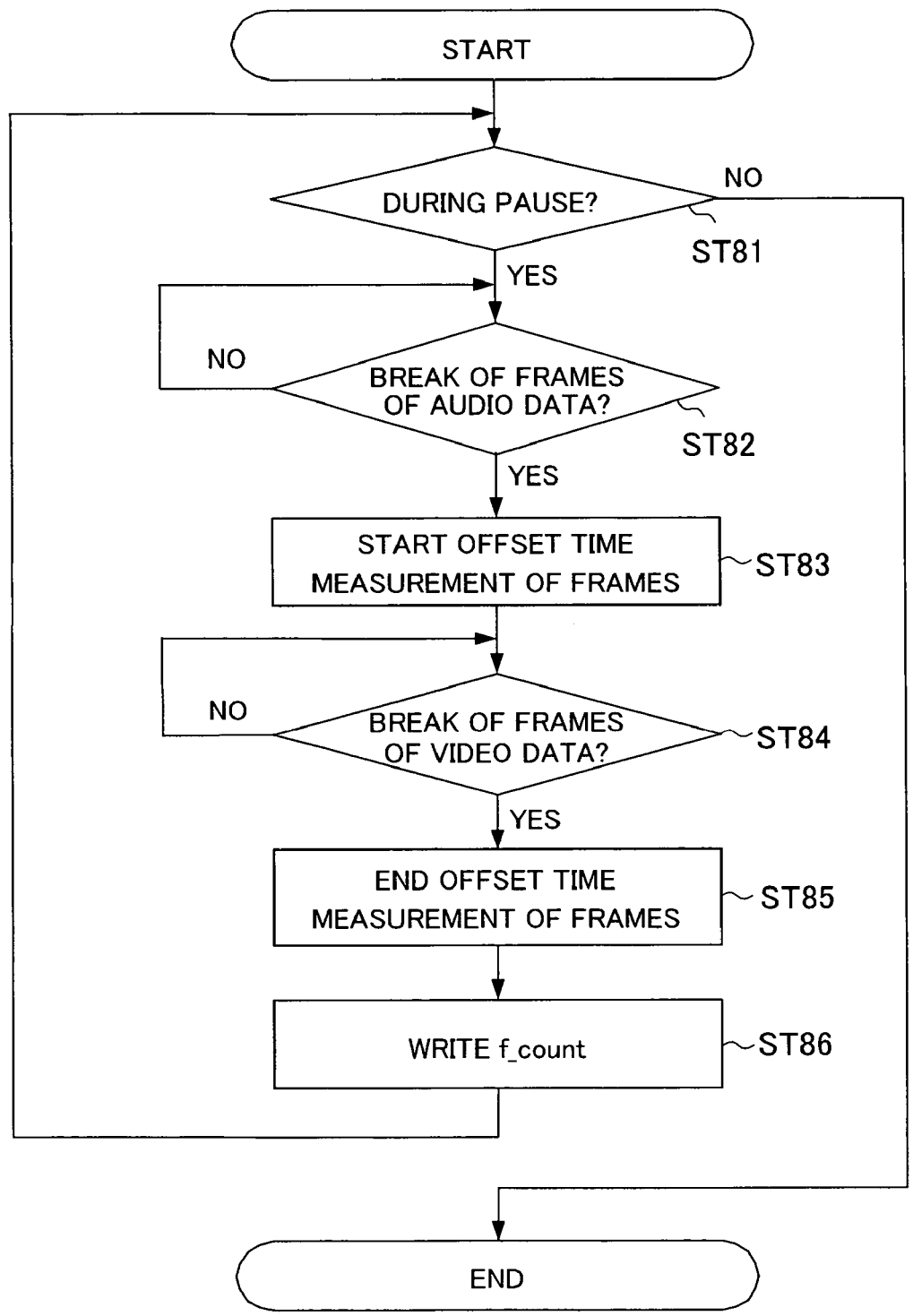
FIG. 8 is a flow chart showing processing after a pause request processing from the host 1 (processing during pause).

In FIG. 8, first, it is judged if the operation is paused at present or not (ST81). If during a pause, a break of the frames of audio data is awaited. When a break of frames of audio data is detected (ST82), the time information is acquired and stored from the timer 24, and the measurement of the frame offset times of the audio data and the video data is started (ST83).

Next, the AV controller 21 waits for a break of the frames of the video data. When detecting a break of the frames of the picture (ST84), it acquires and stores the time information from the timer 24 ends the measurement of the frame offset times of the audio data and the video data (ST85).

Then, the AV controller 21 writes the frame offset time (f_count) from the time of start of measurement of the offset times of the audio data and the video data in ST83 and the time of ending the measurement of the offset time of the audio data and the video data at ST85 (ST86).

By repeatedly performing the above processing during a pause, the measurement of the frame offset time (f_count) is continued. The frame offset time (f_count) is overwritten in the memory in the AV controller 21, therefore indicates the offset time of the latest audio data and video data during the pause. Here, the f_count is constantly updated because it cannot be predicted when a pause release request will occur, and the system must be ready for the request.

Figure 9:
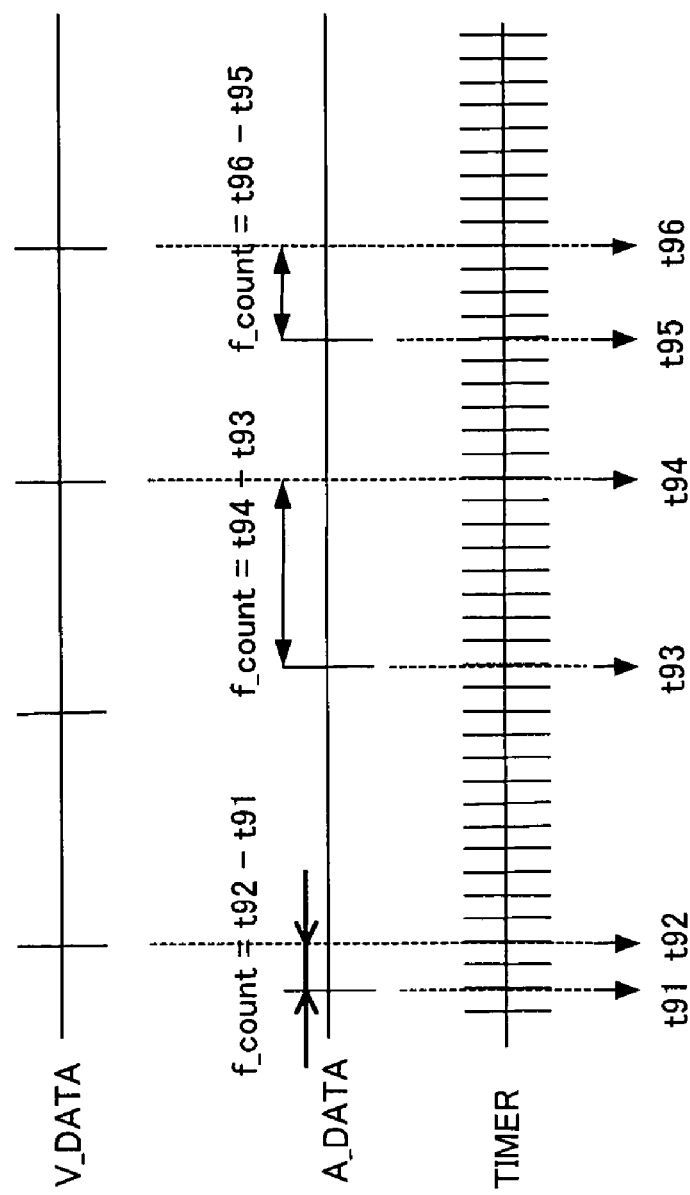
FIG. 9 is a diagram illustrating a method of measurement of a frame offset time (f_count).

FIG. 9 illustrates a method of measurement of the frame offset time (f_count) explained based on the flow chart of FIG. 8.

When detecting a break of the audio data, the AV controller 21 acquires the time information t91 from the timer 24 and starts the measurement of the offset time of the audio data and the video data.

Next, when detecting a break of the video data, the AV controller 21 acquires the time information t92 from the timer 24 and measures the offset time of the audio data and the video data (t92-t91). Here, the measured offset time of the audio data and the video data becomes the frame offset time (f_count).

This control is repeatedly performed based on the audio data during a pause so the latest frame offset time (f_count) is always stored. In FIG. 9, the latest value of the frame offset time (f_count) is the difference between the time t95 and the time t96 (t96-t95).

Next, the processing for a pause release request from the host 1 will be explained.

Namely, the method of the AV controller 21 determining if the re-start of input of the audio data is to be delayed or the re-start of input of the video data is to be delayed or neither of them is to be delayed and eliminating the AV synchronization offset based on the time of a pause request and the offset of the audio data and the video data measured during the pause when a pause release request is issued from the host 1 will be explained.

Figure 10:
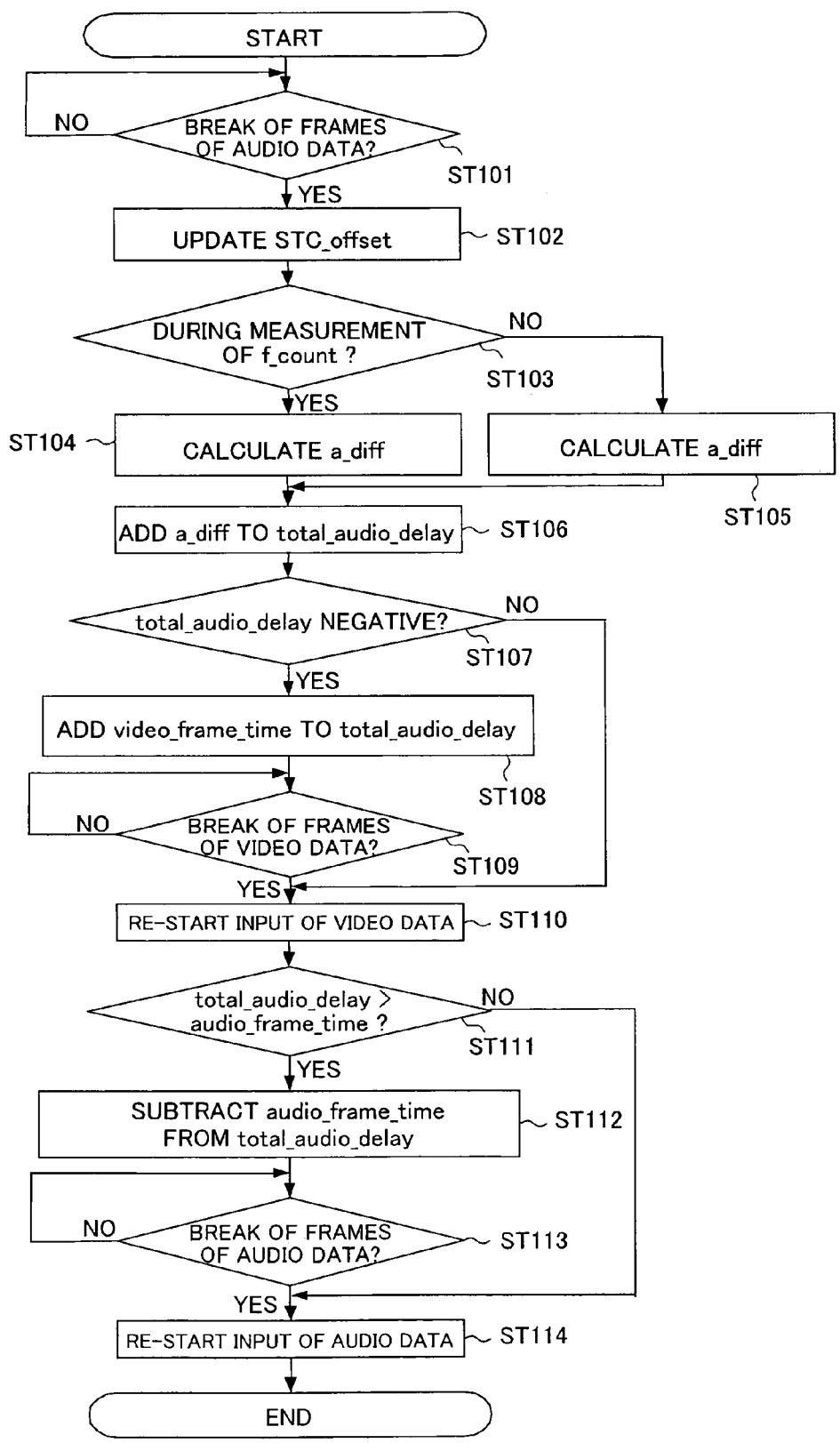
FIG. 10 is a flow chart showing processing performed in the AV controller 21 when a pause release request is issued from the host 1.

FIG. 10 is a flow chart showing the processing performed in the AV controller 21 when a pause release request is issued from the host 1.

Note that a_diff of the flow chart of FIG. 10 represents the audio correction time constituted by the offset of the audio data and the video data between the time of a pause and the time of the pause release. Further, total_audio_delay in the flow chart of FIG. 10 is the cumulative audio correction time constituted by a variable of cumulative addition of the offset of the audio data with respect to the video data and is initialized to 0 at the time of system initialization.

Further, as already explained, the frame offset time (f_count) is updated at the timing of a break of the video data frames. Accordingly, in a time axis, the time from a break of frames of the audio data to a break of frames of the video data means "during measurement of the offset time of the audio data and video data" in the flow chart of FIG. 10.

For example, the time indicated by the laterally oriented arrows in FIG. 9 means the time during measurement of the offset time of the audio data and the video data. Times other than this mean times not during measurement of the offset time of the audio data and the video data.

In FIG. 10, when receiving a pause release request from the host 1, the AV controller 21 waits for a break of frames of the video data. When detecting a break of frames of the video data (ST101), it updates the STC_offset (ST102).

Thereafter, the AV controller 21 judges if it is measuring the offset time of the audio data and the video data or not (ST103). If it is measuring the offset time of the audio data and the video data, the AV controller 21 finds the audio correction time (a_diff) constituted by the offset time of the audio data and the video data at the time of a pause and the time of a pause release based on Equation (1) explained later (ST104). If it is not measuring the time, the AV controller 21 finds the audio correction time (a_diff) based on Equation (2) explained later (ST105).

Details of the audio correction time (a_diff) will be explained later, but this represents the offset of the audio data with respect to the video data to be corrected at the time of pause release in pause processing based on the audio delay time a_delay at the time of a pause and the frame offset time (f_count). When the audio correction time (a_diff) has a positive value, this means that the audio data is delayed with respect to the video data, while when the audio correction time (a_diff) has a negative value, this means that the audio data is advanced with respect to the video data.

Next, the audio correction time (a_diff) found at step ST104 or step ST105 is added to the cumulative audio correction time total_audio_delay (ST106).

Accordingly, the cumulative audio correction time total_audio_delay having the initial value 0 at the time of activation of the system is successively cumulatively added at step ST106 for a plurality of pause processings during the system operation. Contrary to the fact that the audio correction time (a_diff) is the amount of the offset of the audio data to be corrected at the time of each pause processing, the cumulative audio correction time total_audio_delay becomes the cumulative value obtained by adding the audio correction time (a_diff) of each time, therefore this becomes the audio data correction value with respect to the video data to be actually corrected.

The processing after step ST107 is the processing for determining how the offset of the AV synchronization is controlled, specifically, whether or not the offset of the audio data with respect to the video data is to be corrected, and, in the case where it is to be corrected, which of the audio data and the video data is to be delayed, based on the value of the cumulative audio correction time total_audio_delay cumulatively added for each pause processing in system operation.

First, at step ST107, when the cumulative audio correction time total_audio_delay is negative, that is, the audio data is advanced, a time having a length of one frame of the video data is added to the cumulative audio correction time total_audio_delay (ST108), then processing for actually delaying the re-start of the video data by one frame is performed. The processing for delaying the re-start of the video data by one frame is realized by waiting for the re-start of input of the video data until a break of frames of the video data is detected (ST109).

When detecting a break of the video frames, the input of the video data is re-started (ST110).

When the cumulative audio correction time total_audio_delay is not negative at step ST107, that is, when the audio data is the same or delayed, the input is re-started as it is without delaying the video data (ST110), and the routine proceeds to step ST111.

At step ST111, when the positive cumulative audio correction time total_audio_delay is 1 audio data frame (audio_frame_time) or more, it is necessary to delay the re-start of the audio data, therefore the routine proceeds to step ST112 on.

When the cumulative audio correction time total_audio_delay is positive, but less than 1 audio data frame, the processing is re-started without delaying the audio data (ST114).

At step ST112, a time of 1 frame length of the audio data is subtracted from the cumulative audio correction time total_audio_delay (ST112), then the processing for actually delaying the re-start of the audio data by 1 frame is carried out. This processing for delaying the re-start of the audio data by 1 frame is accomplished by delaying the re-start of input of the audio data until a frame break of the audio data is detected (ST113).

When detecting a break of audio frames, the input of the video data is re-started (ST114).

Next, a method of calculation of the audio correction time (a_diff) at steps ST104 and ST105 of FIG. 10 will be explained with reference to FIG. 11 and FIG. 12.

Figure 11:
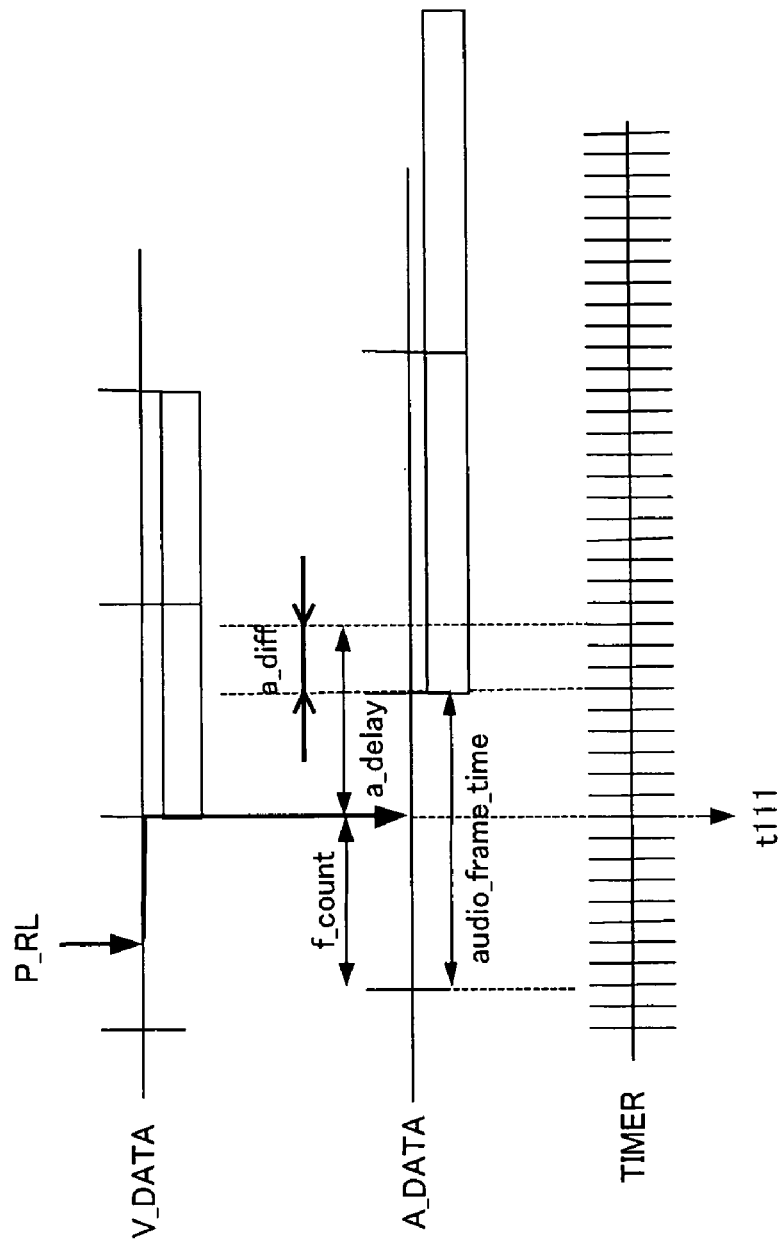
FIG. 11 is a timing chart illustrating a method of calculation of an audio correction time (a_diff) during measurement of the offset time during a pause.

FIG. 11 is a timing chart illustrating the method of calculation of the audio correction time (a_diff) during measurement of the offset time during a pause.

The timing chart shown in FIG. 11 shows a case when measuring the f_count, that is, a case where the audio correction time (a_diff) is calculated by using the value of the frame offset time (f_count) found after the pause release request since the pause release request (P_RL) from the host 1 with respect to the AV controller 21 was made during a period from a break of frames of the audio data to a break of frames of the video data.

Below, according to FIG. 11, an explanation will be given of the routine performed at step ST104 of FIG. 10 in order to calculate the audio correction time (a_diff).

When receiving a pause release request from the host 1, the AV controller 21 acquires the time t111 from the timer 24 matching with the frame period of the video and re-sets the STC_offset based on the pause_STC_offset stored at the time of the pause request.

Further, the frame offset time (f_count) is measured at the timing of the time t111.

Here, a_delay is the frame offset time of the audio data and the video data at the time of a pause as already explained and is the data calculated and held at the time of the pause. Further, audio_frame_time is the frame period of the audio data.

As apparent from FIG. 11, the audio correction time (a_diff) can be found by the following Equation (1):

$$a\_diff = a\_delay + f\_count - audio\_frame\_time \quad (1)$$

Figure 12:
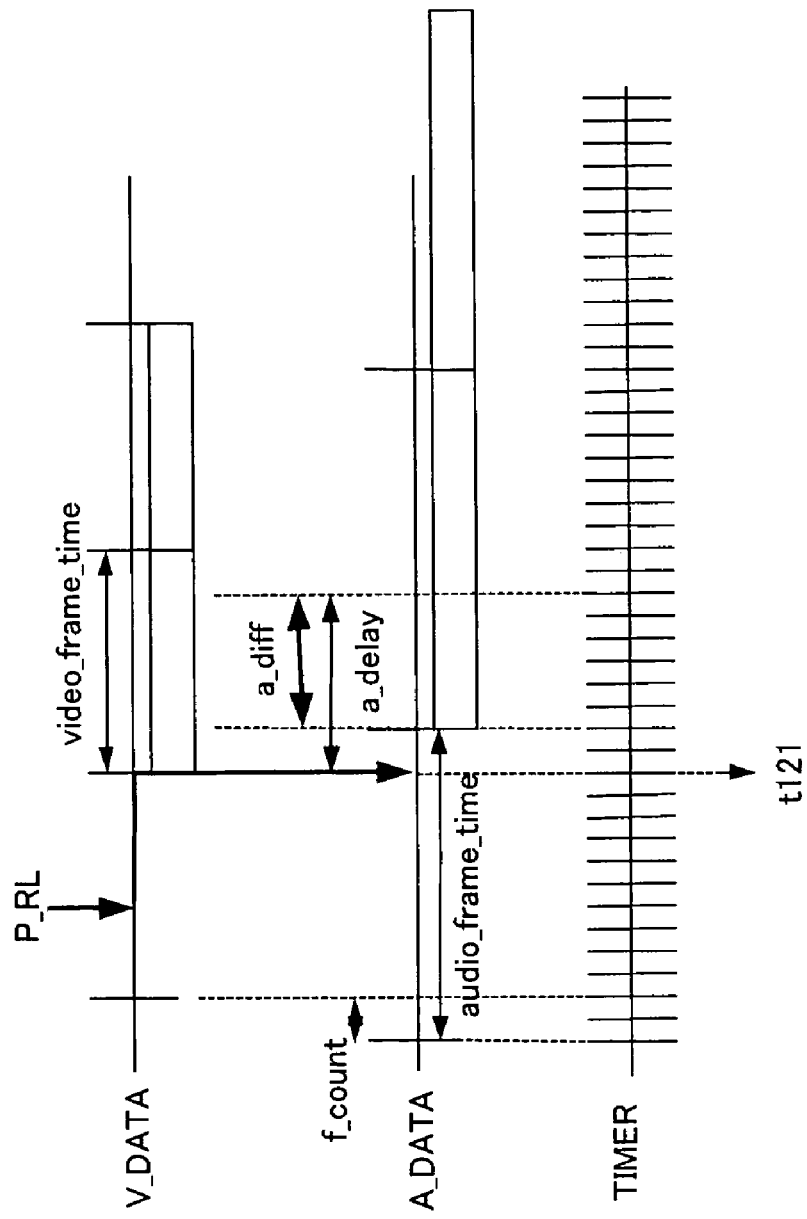
FIG. 12 is a timing chart illustrating a method of calculation of the audio correction time (a_diff) when not during measurement of the offset time during a pause.

FIG. 12 is a timing chart illustrating the method of calculation of the audio correction time (a_diff) not during measurement of the offset time during a pause.

The flow chart shown in FIG. 12 shows the case during measurement of the f_count, that is, the case where the audio correction time (a_diff) is calculated using the frame offset time (f_count) found before the pause release request since the pause release request from the host 1 with respect to the AV controller 21 was made during the period from a break of frames of the video data to a break of frames of the audio data.

Below, according to FIG. 12, an explanation will be given of a routine performed at step ST105 of FIG. 10 in order to calculate the audio correction time (a_diff).

When receiving a pause release request from the host 1, the AV controller 21 acquires the time t121 from the timer 24 matching with the frame period of the picture and re-sets the STC_offset based on the pause_STC_offset stored at the time of the pause request.

Here, a_delay is the audio delay time during a pause constituted by the audio data and video data offset time at the time of a pause as already explained and is data calculated and held at the time of a pause.

Further, audio_frame_time is the frame period of the audio data.

video_frame_time is the frame period of the video data. As apparent from FIG. 12, the audio correction time (a_diff) can be found by the following Equation (2):

$$a\_diff = a\_delay + f\_count - audio\_frame\_time + video\_frame\_time \quad (2)$$

Next, the processing for eliminating the AV synchronization offset at the time of pause release will be explained in detail using FIG. 13 and FIG. 14.

Figure 13:
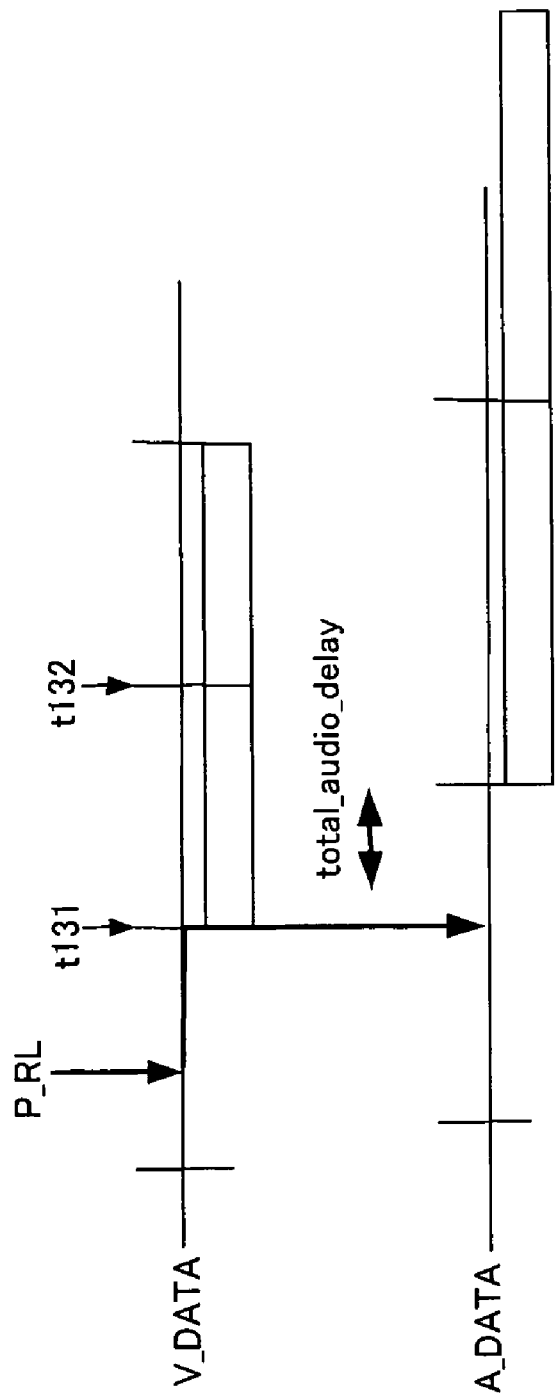
FIG. 13 is a diagram for explaining processing for eliminating AV synchronization offset by processing for delaying a re-start of input of the video data by 1 frame.

FIG. 13 is a diagram for explaining the processing for eliminating the AV synchronization offset by the processing delaying the re-start of input of the video data by 1 frame.

The control for delaying the re-start of input of the video data is realized by correcting the AV synchronization offset (ST108) and performing processing for delaying the re-start of the video data by 1 frame (ST109) until a break of frames of the video data is found since the cumulative audio correction time total_audio_delay is negative (ST107) as already explained according to the flow chart at the time of a pause release of FIG. 10.

In FIG. 13, when receiving a pause release request from the host 1, the AV controller 21 waits for a break of frames of the video data. When detecting a break of the frames of the video data (time t131), it calculates the cumulative audio correction time total_audio_delay based on the processing flow of FIG. 10. This is negative, therefore the input of the video data is re-started after waiting for 1 video frame (time t132).

Figure 14:
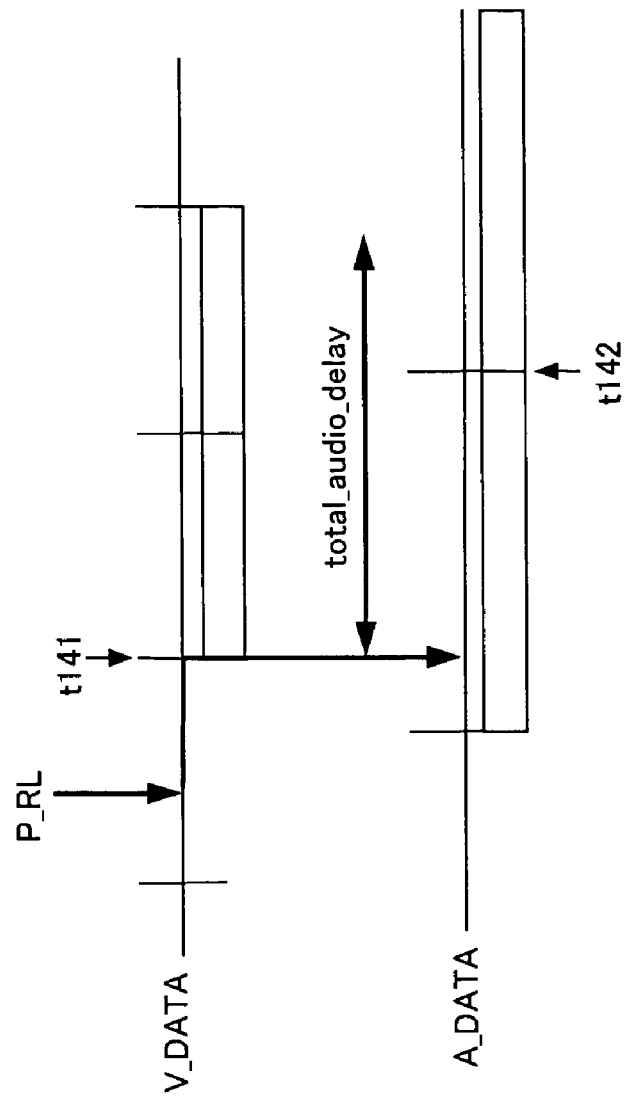
FIG. 14 is a diagram for explaining processing for eliminating AV synchronization offset by processing for delaying a re-start of input of the audio data by 1 frame.

FIG. 14 is a diagram for explaining the processing for eliminating the AV synchronization offset by processing for delaying the re-start of input of the audio data by 1 frame.

The control for delaying the re-start of input of the audio data is realized by processing for correcting the AV synchronization offset (ST112) when the cumulative audio correction time total_audio_delay is 1 audio frame or more as already explained with reference to the flow chart at the time of a pause release of FIG. 10 and delaying the re-start of the audio data by 1 frame (ST113) until a break of frames of the audio data is found.

In FIG. 14, when receiving a pause release request from the host 1, the AV controller 21 waits for a break of frames of the video data. When detecting a break of frames of the video data (time t141), it waits for 1 audio frame and then re-starts the input of the audio data (time t142) since the total_audio_delay exceeds 1 audio frame.

As apparent from steps ST107 and ST111 of FIG. 10, when the total_audio_delay is positive and does not exceeds 1 audio frame, neither of the re-starts of input of audio data/video data is delayed. In this case, the offset of the audio data and the video data occurring in the pause processing at this time is cumulatively added to the total_audio_delay.

Of course, even if one of the re-start of input of the audio data/video data is delayed to eliminate the AV synchronization offset, due to the processing of steps ST108 and ST112 of FIG. 10, the cumulative audio correction time (total_audio_delay) does not become 0, therefore the AV synchronization offset is not completely eliminated.

However, according to the AV recording apparatus according to the present invention, during operation of the AV recording apparatus, the cumulative audio correction time (total_audio_delay) is always within 1 audio data frame, therefore the difference thereof will not be recognized by the viewer and it becomes possible to sufficiently eliminate the AV synchronization offset.

INDUSTRIAL APPLICABILITY

The present invention can be applied to an apparatus for recording or reproducing audio data and video data in synchronization.

LIST OF REFERENCES 1, 1a . . . host
2, 2a . . . data controller
21, 21a . . . audio/video controller (AV controller)
22, 22a . . . audio controller
23, 23a . . . audio data memory
24, 24a . . . timer
25, 25a . . . video data memory 26, 26a . . . video controller
3, 3a . . . system encoder
31, 31a . . . audio encoder
32, 32a . . . multiplexer
33, 33a . . . video encoder

The invention claimed is:

1. An audio/video synchronization processing apparatus for synchronizing video data and audio data having different predetermined frame lengths, comprising:
   a timer;
   a storage means for storing a start time of each frame of the video data and audio data, a time of a pause request, and a time of a pause release request counted by the timer; and
   a controlling means for determining whether to delay one of the video data and the audio data and depending on a result thereof for determining which of the video data and the audio data to delay in frame units after the pause release request based on the start time of each frame of the video data and audio data, the time of the pause request, and the time of the pause release request.

2. An audio/video synchronization processing apparatus as set forth in claim 1, wherein the controlling means
   calculates an audio delay time constituted by a delay time of the frames of the audio data based on breaks of frames of the video data at the time of a pause request,
   monitors a frame offset time constituted by a difference of the frame start time of the audio data with respect to the video data at each start time of each frame of the video data after a pause request,
   calculates an audio correction time based on the audio delay time and the frame offset time at the time of a pause release request for a pause request, and
   determines whether to delay one of the video data and the audio data and depending on the result thereof determines which of the video data and the audio data to delay in frame units after a pause release request based on a cumulative audio correction time obtained by cumulatively adding the audio correction time calculated for each pause release request.

3. An audio/video synchronization processing apparatus as set forth in claim 2, wherein said controlling means delays said video data by one frame with respect to said audio data after a pause release request when judging that said audio data is advanced with respect to the video data based on said cumulative audio correction time.

4. An audio/video synchronization processing apparatus as set forth in claim 2, wherein said controlling means delays said audio data by one frame with respect to said video data after a pause release request when judging that said audio data is delayed by one frame or more with respect to the video data based on said cumulative audio correction time.

5. An audio/video synchronization processing method for synchronizing video data and audio data having different predetermined frame lengths, comprising:
   a step of calculating an audio delay time constituted by a delay time of the frames of the audio data based on breaks of frames of the video data at the time of a pause request,
   a step of monitoring a frame offset time constituted by a difference of the frame start time of the audio data with respect to the video data at each start time of each frame of the video data after a pause request,
   a step of calculating an audio correction time based on the audio delay time and the frame offset time at the time of a pause release request for a pause request, and
   a step of determining whether to delay one of the video data and the audio data and depending on a result thereof determining which of the video data and the audio data to delay in frame units after a pause release request based on a cumulative audio correction time obtained by cumulatively adding the audio correction time calculated for each pause release request.

6. An audio/video synchronization processing method as set forth in claim 5, further comprising delaying said video data by one frame with respect to said audio data after a pause release request when judging that said audio data is advanced with respect to the video data based on said cumulative audio correction time.

7. An audio/video synchronization processing apparatus as set forth in claim 5, further comprising delaying said audio data by one frame with respect to said video data after a pause release request when judging that said audio data is delayed by one frame or more with respect to the video data based on said cumulative audio correction time.

8. An audio/video recording apparatus for synchronizing video data and audio data having different predetermined frame lengths, comprising:
   a timer;
   a storage means for storing a start time of each frame of the video data and audio data, a time of a pause request, and a time of a pause release request counted by the timer;
   a synchronization controlling means for synchronizing the audio data after a pause release request in frame units based on the start time of each frame of the video data and audio data, the time of the pause request, and the time of the pause release request; and
   a multiplex data generating means for adding time information to the video data and the audio data synchronized by the synchronization controlling means and generating multiplex data.

* * * * *